United States Patent [19]

Lee

[11] Patent Number: 5,050,900
[45] Date of Patent: Sep. 24, 1991

[54] FOLDABLE FRAME STRUCTURE FOR DOUBLE-SEAT BABY CART

[76] Inventor: Fan-Chen Lee, 2 Fl., No. 287, Fu Hsin Rd., San Hsia Chen, Taipei Hsien, Taiwan

[21] Appl. No.: 520,913

[22] Filed: May 9, 1990

[51] Int. Cl.⁵ .............................................. B62B 7/06
[52] U.S. Cl. .................................. 280/642; 280/647; 280/658; 297/245
[58] Field of Search ............... 280/647, 650, 655, 657, 280/658, 641, 642; 297/243, 244, 245, 68, 71, 77

[56] References Cited
U.S. PATENT DOCUMENTS
4,746,140  5/1988  Kassai .................................. 280/650

Primary Examiner—Andres Kashnikow
Assistant Examiner—Richard Camby
Attorney, Agent, or Firm—Varndell Legal Group

[57] ABSTRACT

A foldable frame structure for a foldable baby cart, which comprises two bilaterally symmetrical sub-frame assemblies connected together by two foldable fixed foot-pedal levers transversely. The sub-frame assemblies each compriese transversely an upper handle frame having an upper connection foldably connected thereto in series at its front end by a foldable link plate, a lower seat frame having a lower connection foldably connected thereto in series at its front end, back seat adjustment sheet and a fixed back seat connection tube foldably vertically connected between the upper connection and the lower connection at the front, and a front frame having its upper end pivoted to the front end of the handle frame by a plastic connection and its middle part connected to the connecting end between the fixed back seat connection tube and the seat frame.

1 Claim, 5 Drawing Sheets

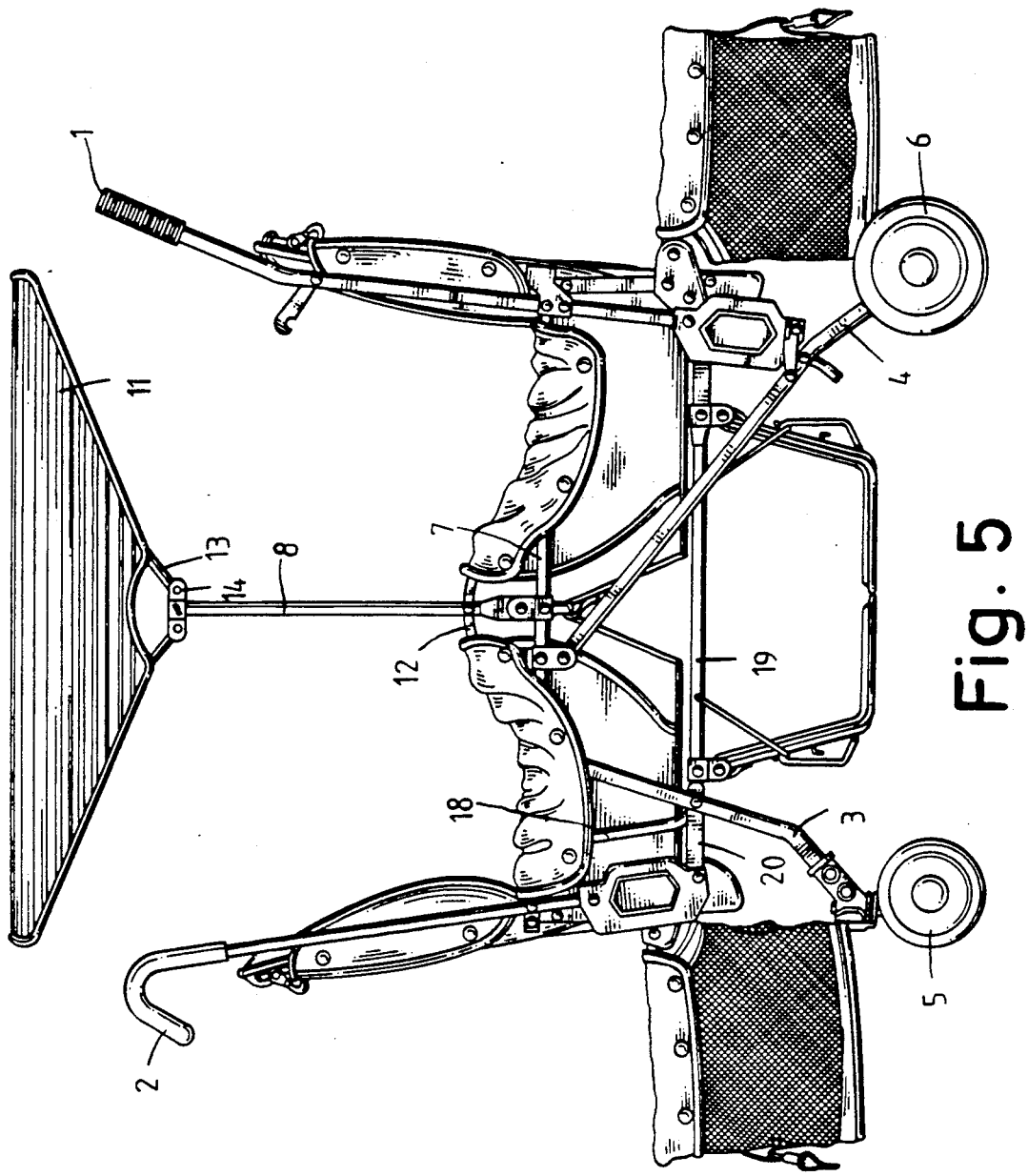

FOLDABLE FRAME STRUCTURE FOR DOUBLE-SEAT BABY CART

BACKGROUND AND SUMMARY OF THE INVENTION

The present invention is related to baby carts and more particularly to a double-seat baby cart which has a foldable frame structure to minimize its space occupation when not in use.

Regular baby carts are generally of single seat structure for carrying a baby. In order to minimize space occupation, a baby cart must be designed collapsible. Regular single seat baby carts are generally collapsible and can reduce space occupation when not in use. There is also a kind of baby cart which provides two opposite seats for carrying two babies at the same time. For such a double-seat design, the bilateral handing frames of a baby cart must be extended. Therefore, when a double-seat baby cart of the conventional design is collapsed, it still requires a big space for storage.

The present invention has been accomplished to solve the said problem. It is therefore, the main object of the present invention to provide a foldable frame structure for a double-seat baby cart to minimize space occupation when in a collapsed condition.

BRIEF DESCRIPTION OF THE DRAWINGS

FIG. 5 is a side view illustrating the embodiment of the present invention.

DETAILED DESCRIPTION OF THE PREFERRED EMBODIMENT

Figure 1:
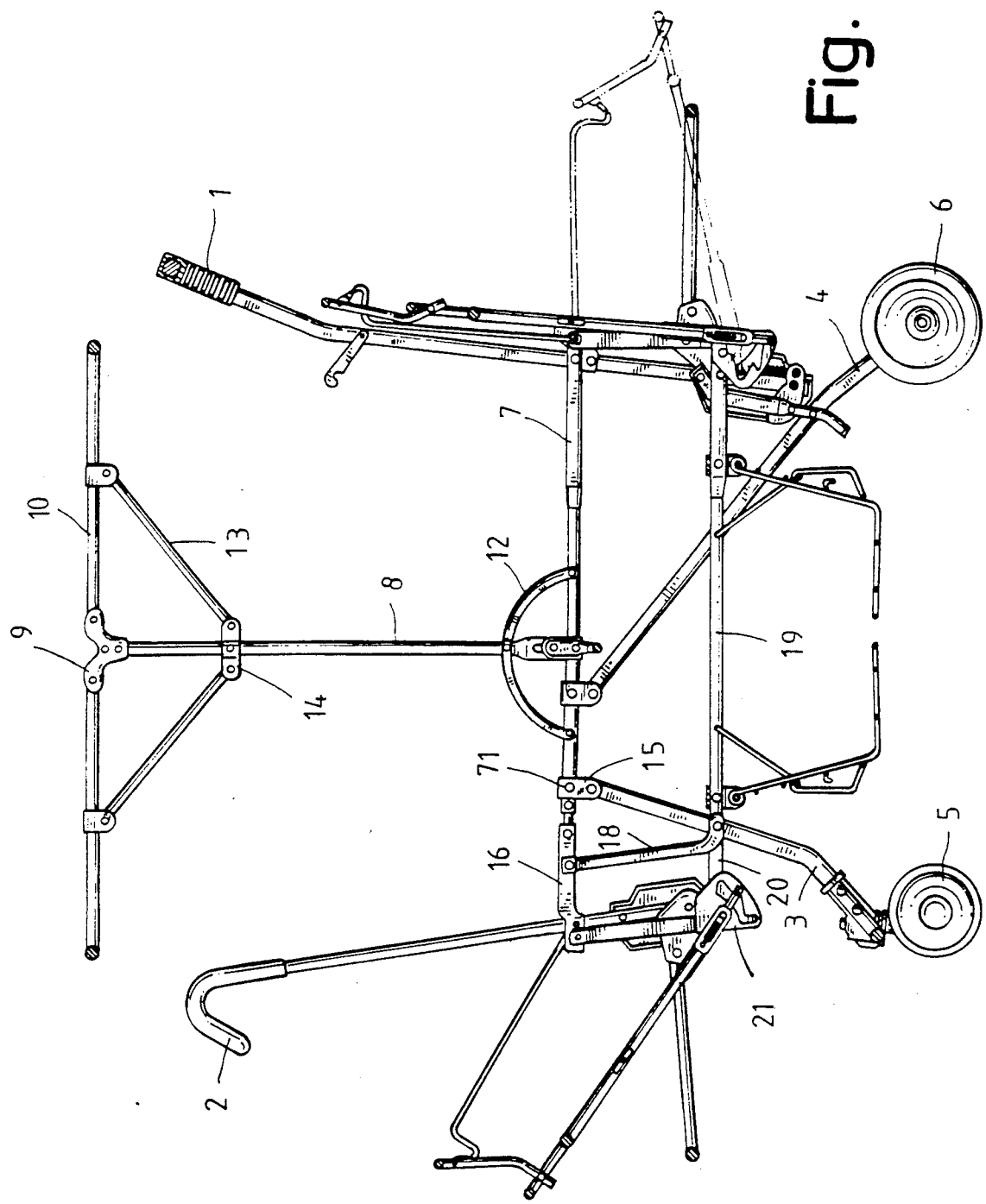
FIG. 1 is a side and sectional view of a foldable frame structure according to the present invention.

Referring to FIGS. 1 and 5, a foldable frame structure for baby cart in accordance with the present invention is generally comprised of a pair of front frames 3 and a pair of rear frames 4 respectively coupled with a pair of front wheels 5 and a pair of rear wheels 6 at the bottom to support and carry the frame structure to move, two opposite handles 1, 2 vertically mounted thereon at two opposite ends for the holding of the hand so that the frame structure can be pushed and pulley. A pair of handle frames 7 are transversely arranged in parallel with each other and connected between the two opposite handles 1, 2. A sun shade 11 is foldably mounted on the two parallel handle frames 7, which is comprised of two parallel canopy fixed vertical tubes 8 movably secured to two arc fixed seats 12 to hold each a foldable frame 10 and two canopy active tubes 13 by means of a two-dimension foldable sheet 9 and a canopy active slip part 14 respectively. When the two opposite foldable frames 10 are pressed downward, the connected two-dimension foldable sheets 9 are simultaneously turned to push the canopy active tubes 13 to force the canopy active slip parts 14 to move downward along the canopy fixed vertical tubes 8 so that the sun shade 11 is collapsed. Two transparent windows 110 are made on the sun shade 11 through which one can clearly see the babies who sit in the double-seat baby cart.

Figure 2:
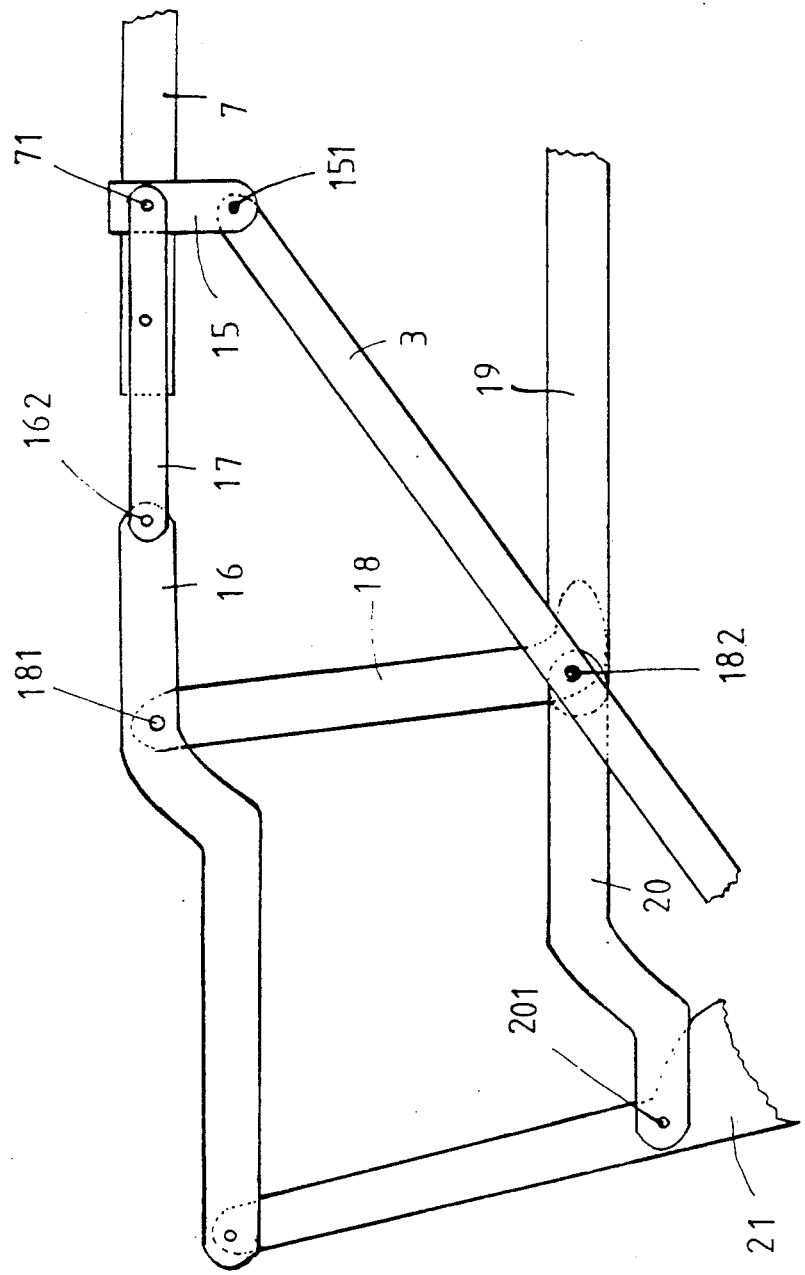
FIG. 2 is a partly enlarged view thereof.

Referring to FIG. 2, there is provided a plastic connection 15 to pivot a front frame 3 to a handle frames 7, which is respectively connected with the handing frame at pivot point 71 and the front frame at pivot point 11. A foldable link plate 17 is provided to connect a curved upper connection 16 to the front end of the handle frame 7, with its front end pivoted to the pivot point 71 of the handing frame 7 and its rear end pivoted to a pivot point 162 of the curved upper connection 16. A fixed back seat connection tube 18 is pivotably connected between the upper connection 16 at pivot point 181 and a seat frame 19 at pivot point 182. The front end of the upper connection 16 is pivoted with a back adjustment sheet 21 at a pivot point, which back adjustment sheet 21 has its lower end pivoted with a curved lower connection 20 at pilot point 201. The curved lower connection 20 is respectively connected between the back adjustment sheet 21 at pivot point 201 and the seat frame 19 at pivot point 182.

Figure 3:
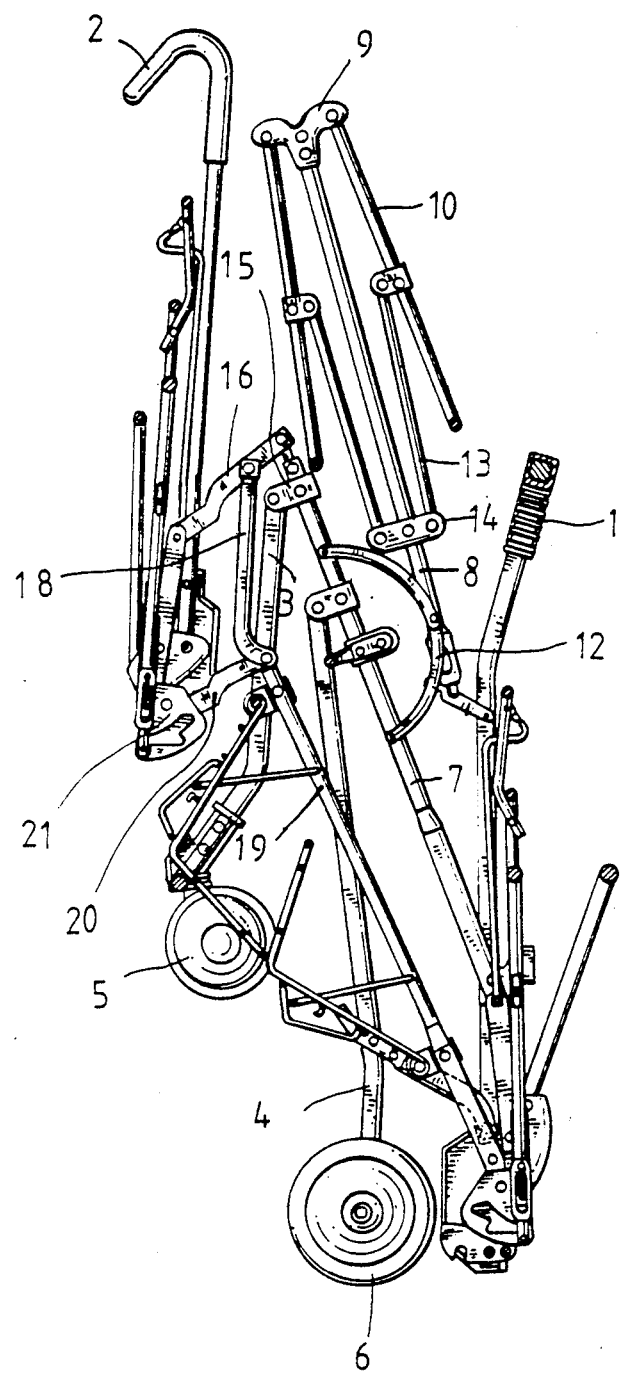
FIG. 3 is a perspective side view of the foldable frame structure of FIG. 1 when it is in a collapsed condition.
Figure 4:
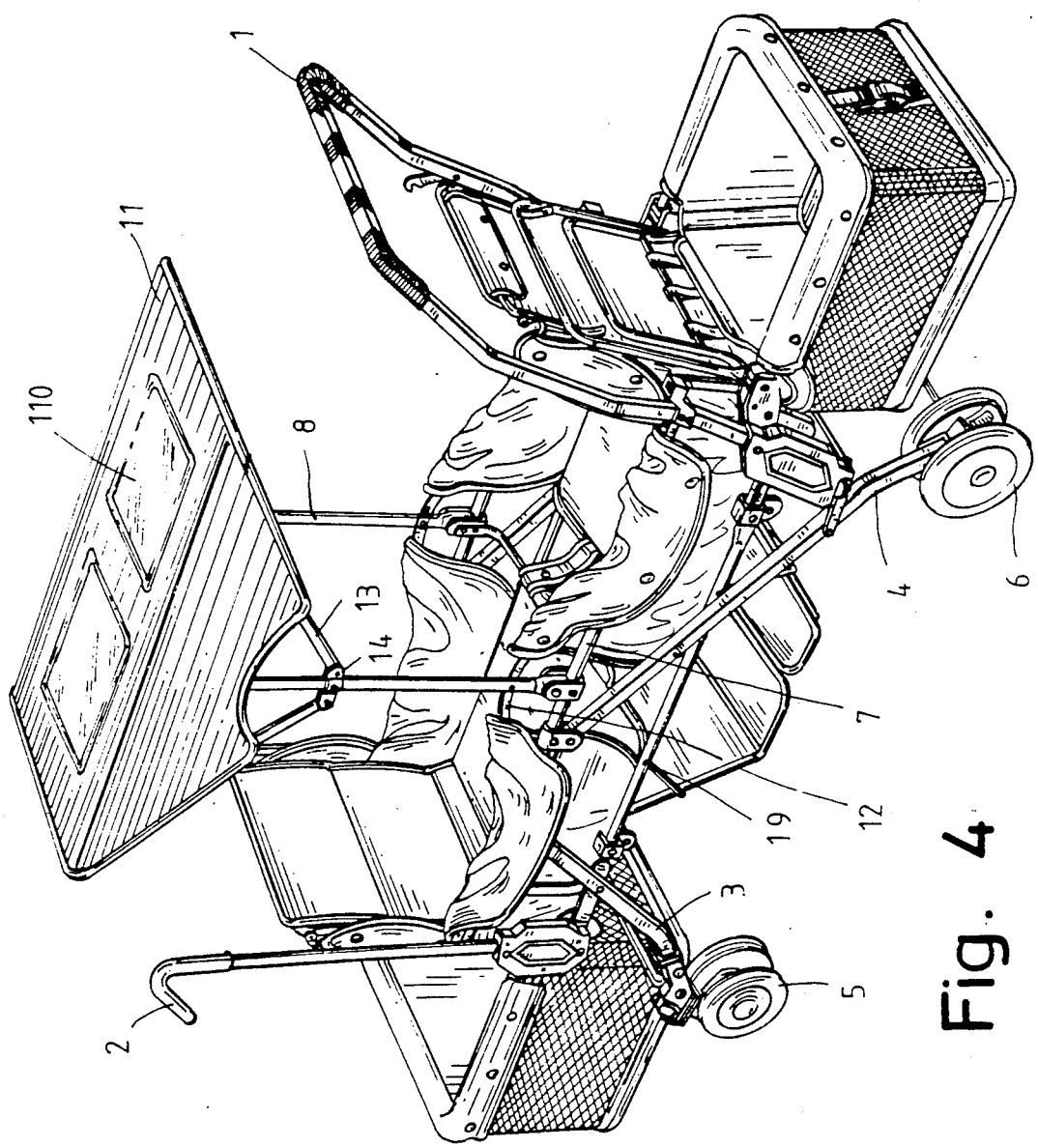
FIG. 4 is a perspective view illustrating the embodiment of the present invention.

Referring to FIG. 3, when not in use, a foldable fixed foot-pedal lever (not shown) which is transversely connected between the rear pair of back adjustment sheets 21 is pressed down to release the bilateral seat frames 19 permitting the bilaterally disposed fixed back seat connection tubes 18 to incline and to simultaneously drive the two plastic connections 15 to move so that the curved upper connections 16 are respectively close toward the curved lower connections 20 and the whole frame structure of the baby cart is collapsed into a collapsing condition as shown in FIG. 3.

I claim:

1. A foldable frame structure for a foldable baby cart, comprising:

two symmetrical sub-frame assemblies bilaterally connected together by two foldable fixed foot-pedal levers transversely arranged at two opposite ends thereof, said subassemblies each having a wheel at its two opposite ends, and a sun shade foldably mounted on and above said two symmetrical sub-frame assemblies at their middle, said sun shade including two parallel canopy fixed vertical tubes movably secured to two arc fixed seats for respectively holding a foldable frame and two canopy active tubes by means of a two-dimension foldable sheet and a canopy active slip part, wherein said two symmetrical sub-frame assemblies each comprise a plastic connection foldably connecting a front frame to a handle frame, said plastic connection having one end pivoted to said handle frame at a first pivot point and an opposite end pivoted to said front frame at a second pivot point; a foldable link plate foldably connecting a curved upper connection to said front end of said handle frame, said foldable link plate having its front end pivoted to said first pivot point and its rear end pivoted to a third pivot point on said curved upper connection; a fixed back seat connection tube pivotably connecting said curved upper connection at a fourth pivot point thereon to a seat frame at a fifth pivot point, said seat frame arranged below said handle frame and parallel thereto; said upper curved connection having an end pivoted with a back adjustment sheet at a sixth pivot point, said back adjustment sheet having its lower end pivoted with a curved lower connection at a seventh pivot point, said curved lower connection being respectively connected between said back adjustment sheet at said seventh pivot point and said seat frame at said fifth point.

* * * * *